(12) United States Patent
Yoon et al.

(10) Patent No.: US 11,216,974 B2
(45) Date of Patent: Jan. 4, 2022

(54) STARING DISTANCE DETERMINATION METHOD AND DEVICE

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Chi-yul Yoon, Hwaseong-si (KR); Sang Yoon Han, Seoul (KR); Sang Hwa Lee, Seoul (KR); Yeongil Jang, Namyangju-si (KR); Nam Ik Cho, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/768,765

(22) PCT Filed: Dec. 14, 2017

(86) PCT No.: PCT/KR2017/014685
§ 371 (c)(1),
(2) Date: Jun. 1, 2020

(87) PCT Pub. No.: WO2019/117350
PCT Pub. Date: Jun. 20, 2019

(65) Prior Publication Data
US 2020/0372677 A1    Nov. 26, 2020

(51) Int. Cl.
*G06T 7/73* (2017.01)
*G06T 7/564* (2017.01)
*G06K 9/00* (2006.01)

(52) U.S. Cl.
CPC ............ *G06T 7/75* (2017.01); *G06K 9/00604* (2013.01); *G06T 7/564* (2017.01); *G06T 2207/30201* (2013.01)

(58) Field of Classification Search
CPC . G06F 3/013; G06F 3/012; G06F 3/00; G06F 3/01; G06F 3/005; G06K 9/00597;
(Continued)

(56) References Cited

U.S. PATENT DOCUMENTS 9,311,527 B1 *  4/2016  Yin .......................... G06T 7/73
9,953,247 B2    4/2018  Zhou et al.
(Continued)

FOREIGN PATENT DOCUMENTS

CA    3065131 A1 * 12/2018  ............ G06F 3/012
JP    2005250741 A  *  9/2005
(Continued)

OTHER PUBLICATIONS

Compensation Method of Natural Head Movement for Gaze Tracking System Using an Ultrasonic Sensor for Distance Measurement (Year: 2016).*
(Continued)

*Primary Examiner* — Nizar N Sivji
(74) *Attorney, Agent, or Firm* — Sughrue Mion, PLLC

(57) ABSTRACT

The disclosure relates to a method of determining a gaze distance, the method including obtaining a plurality of images by capturing each of both eyes of a user, determining, from each of the plurality of images, a corner point located at an edge of the eye, a location of a pupil, and an eye contour, determining each of gaze directions of both of the eyes based on a difference between a reference point and the location of the pupil, wherein the reference point is determined based on the eye contour and a location of the
(Continued)

corner point, and determining a gaze distance based on a difference between the gaze directions of both of the eyes.

11 Claims, 13 Drawing Sheets

(58) Field of Classification Search
CPC ............ G06K 9/00248; G06K 9/4604; G06K 9/00302; G06K 9/627; G06K 9/00604; G06K 9/4609; G06K 9/0061; G06T 7/246; G06T 7/564; G06T 19/20; G06T 2207/30041; G06T 7/75; G06T 2207/30201; G06T 7/73
See application file for complete search history.

(56) References Cited

U.S. PATENT DOCUMENTS

| | | | | |
|---|---|---|---|---|
| 10,681,276 | B2* | 6/2020 | Jarvenpaa | .......... H04N 5/23258 |
| 2008/0181452 | A1 | 7/2008 | Kwon et al. | |
| 2009/0109400 | A1* | 4/2009 | Yoshinaga | ......... G06K 9/00248 351/210 |
| 2010/0027890 | A1* | 2/2010 | Yoshinaga | ........... G06K 9/0061 382/195 |
| 2011/0310238 | A1 | 12/2011 | Koh et al. | |
| 2013/0083976 | A1* | 4/2013 | Ragland | ................. A61B 3/113 382/117 |
| 2013/0222644 | A1* | 8/2013 | Son | ......................... G06F 3/013 348/239 |
| 2014/0043459 | A1* | 2/2014 | Tsukizawa | ............. A61B 3/113 348/78 |
| 2014/0075349 | A1* | 3/2014 | Yun | ....................... G06F 16/487 715/764 |
| 2014/0354514 | A1 | 12/2014 | Aronsson | |
| 2016/0370605 | A1* | 12/2016 | Ain-Kedem | ....... G06K 9/00604 |
| 2017/0119298 | A1* | 5/2017 | Cheung | ............. G06K 9/00248 |
| 2017/0286771 | A1* | 10/2017 | Ishii | ..................... A61B 3/0025 |
| 2018/0120932 | A1* | 5/2018 | Sengelaub | ......... G06K 9/00604 |
| 2020/0103980 | A1* | 4/2020 | Katz | ....................... G06F 3/167 |
| 2020/0162713 | A1* | 5/2020 | Zink | ..................... G06F 3/1446 |

FOREIGN PATENT DOCUMENTS

| | | | |
|---|---|---|---|
| KR | 10-0949743 B1 | 3/2010 | |
| KR | 10-2012-0006819 A | 1/2012 | |
| KR | 10-1255219 B1 | 4/2013 | |
| KR | 10-1286965 B1 | 7/2013 | |
| KR | 10-1288447 B1 | 7/2013 | |
| KR | 10-1383235 B1 | 4/2014 | |
| KR | 10-1501165 B1 | 3/2015 | |
| KR | 10-2016-0026565 A | 3/2016 | |
| KR | 10-2016-0093523 A | 8/2016 | |
| KR | 10-1745774 B1 | 6/2017 | |
| KR | 10-2017-0091467 A | 8/2017 | |
| WO | 2015/138271 A1 | 9/2015 | |
| WO | WO-2018004615 A1 * | 1/2018 | .............. G06F 3/011 |

OTHER PUBLICATIONS

Combining Head Pose and Eye Location Information for Gaze Estimation (Year: 2012).*
Pupil Localisation and Eye Centre Estimation Using Machine Learning and Computer Vision (Year: 2020).*
Automatic Analysis of Facial Activity for Multi-Modal Human-Machine Applications (Year: 2007).*
Moritz Kassner et al., "Pupil: An Open Source Platform for Pervasive Eye Tracking and Mobile Gazebased Interaction", arXiv:1405.0006v1 [cs.CV], Apr. 30, 2014, pp. 1-10, 10 pages total.
John Canny, "A Computational Approach to Edge Detection", IEEE Transactions on Pattern Analysis and Machine Intelligence, vol. PAMI-8, No. 6, Nov. 1986, pp. 679-698, 20 pages total.
J. Illingworth and J. Kittier, "The Adaptive Hough Transform", IEEE Transactions on Pattern Analysis and Machine Intelligence, vol. PAMI-9 , Issue: 5, DOI: 10.1109/TPAMI.1987.4767964, Sep. 1987, 1 page total.
Jingge Gao, Shuqiang Zhang, and Wei Lu, "Application of hough transform in eye tracking and targeting", 2009 9th International Conference on Electronic Measurement & Instruments, DOI 10.1109/ICEMI.2009.5274208, 2009, 1 page total.
Communication dated Sep. 12, 2018 issued by the International Searching Authority in counterpart Application No. PCT/KR2017/014685 (PCT/ISA/220, PCT/ISA/210, and PCT/ISA/237).

* cited by examiner

STARING DISTANCE DETERMINATION METHOD AND DEVICE

TECHNICAL FIELD

The disclosure relates to a method of determining a gaze distance, a device for determining the gaze distance, and a recording medium having recorded thereon a program for executing the method of determining the gaze distance.

BACKGROUND ART

Eye-tracking technology is used in technological fields requiring information regarding a gaze direction and a gaze distance of a user, for example, in virtual/augmented reality, eye-based user interfaces, driver drowsiness detection sensors, and the like. In addition, eye-tracking technology, which is highly useful in detecting a region to which a user immediately reacts and concentrates on, is also widely used in the advertisement industry.

Particularly, with the appearance of devices requiring interfaces for interaction between human and computer, like a VR/AR device, the importance of eye-tracking technology is increasing more and more. Accordingly, although various technologies for estimating a gaze direction and a gaze distance of a user are being studied, technology for more effectively and accurately estimating the gaze direction and the gaze distance is still required.

DESCRIPTION OF EMBODIMENTS

Technical Problem

Provided are a method and device for determining a gaze distance, the method and the device being capable of enhancing an accuracy of a user's gaze distance that is determined based on a gaze direction by determining the gaze direction by using properties of various portions constructing user's eyes.

Solution to Problem

The present disclosure relates to a method of determining a gaze distance, the method including acquiring a plurality of images by capturing each of both eyes of a user, determining a corner point located at an edge of the eye, a location of a pupil, and an eye contour from each of the plurality of images, determining each of gaze directions of both of the eyes based on a difference between a reference point and a location of the pupil, wherein the reference point is determined based on the eye contour and the location of the corner point, and determining the gaze distance based on a difference between the gaze directions of both of the eyes.

BEST MODE

Figure 1:
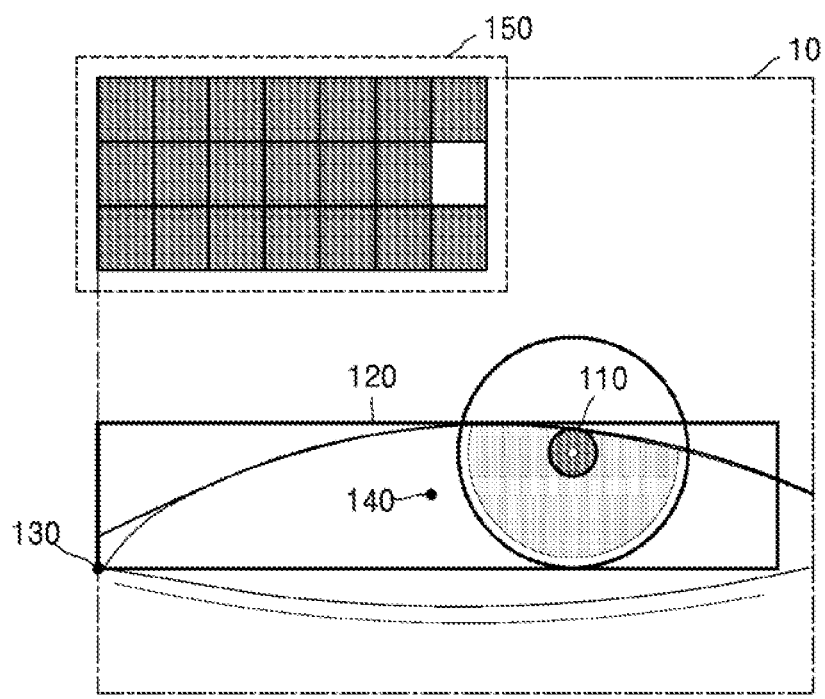
FIG. 1 is a conceptual diagram for describing a method, performed by a device, of determining a gaze distance according to an embodiment.

According to an embodiment, a method of determining a gaze distance includes: acquiring a plurality of images by capturing each of both eyes of a user; determining a corner point located at an edge of the eye, a location of a pupil, and an eye contour from each of the plurality of images; determining each of gaze directions of both of the eyes based on a difference between a reference point and the location of the pupil, wherein the reference point is determined based on the eye contour and the location of the corner point; and determining the gaze distance based on a difference between the gaze directions of both of the eyes.

In the method of determining the gaze distance according to an embodiment, the determining of each of the gaze directions may include: determining a shape of an eyelid from the eye contour; and determining each of the gaze directions based on the difference between the reference point and the location of the pupil and the determined shape of the eyelid.

In the method of determining the gaze distance according to an embodiment, the determining of each of the gaze directions may include determining the gaze directions between the difference between the reference point and the location of the pupil, by using a three-dimensional model of the eye and a camera capturing both eyes of the user, which are previously acquired.

The method of determining the gaze distance according to an embodiment may further include: determining whether the pupil is detected for respective images of both of the eyes of the user acquired after the plurality of images; and maintain gaze directions for the images of both of the eyes of the user acquired after the plurality of images as the determined gaze directions when the pupil is not detected or the eye blinking is detected as a result of the determining.

The method of determining the gaze distance according to an embodiment may further include re-determining the gaze direction based on a three-dimensional distance sensor when the determined gaze distance is equal to or greater than a preset threshold distance.

The method of determining the gaze distance according to an embodiment may further include rendering a virtual image based on the gaze distance.

According to an embodiment, a device for determining a gaze distance includes: a capturing unit configured to acquire a plurality of images by capturing each of both eyes of a user; a memory storing the plurality of images and a plurality of instructions; and at least one processor configured to execute the plurality of instructions to determine a corner point located at an edge of an eye, a location of a pupil, and an eye contour from each of the plurality of images, determine each of gaze directions of both of the eyes based on a difference between a reference point and the location of the pupil, wherein the reference point is determined based on the eye contour and a location of the corner point, and determine the gaze distance based on a difference between the gaze directions of both of the eyes.

MODE OF DISCLOSURE

Terms used in the present specification will be briefly described, and then, the disclosure will be described in detail.

Terms used in the disclosure are general terms that have been widely used in the technical art in consideration of functions in the disclosure. However, the terms may be changed reflecting intentions of those of skill in the art, precedents, or new technologies. In addition, some of the terms may be arbitrarily chosen by the applicant, and in this case, the meaning of the chosen terms will be described in detail in the detailed description of the disclosure. Accordingly, the terms used in the disclosure should not be interpreted based on only their names but have to be defined based on the meaning of the terms together with the descriptions throughout the specification.

Although the terms including ordinal numbers such as "first" and "second" may be used to describe various elements, these elements are not limited by these terms. The terms are only used to distinguish one component from another. For example, a first component may be named as a second component without exceeding the scope of the disclosure, and similarly, the second component may also be named as the first component. The term "and/or" includes a combination of a plurality of related items or any one of the plurality of related items.

When it is described throughout the specification that a portion "includes" a component, unless otherwise described, this means the portion may further include another component and does not preclude the other component. The term "unit" used in the specification means a software component or hardware components such as a field-programmable gate array (FPGA) or an application-specific integrated circuit (ASIC), and performs specific functions. However, the term "unit" is not limited to software or hardware. The "unit" may be in an addressable storage medium or may be arranged so as to operate one or more processors. Thus, for example, the term "unit" may refer to components such as software components, object-oriented software components, class components, and tasks components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, embodiments of the disclosure will be described in detail with reference to the accompanying drawings such that one of ordinary skill in the art may easily implement the disclosure. However, the disclosure may be embodied in many different forms and is not limited to embodiments described herein. Also, parts in the drawings unrelated to the detailed description are omitted to ensure clarity of the disclosure, and like reference numerals denote like elements throughout the specification.

In the present specification, description will be given for a method of determining gaze directions of a user from a plurality of images acquired by capturing each of both eyes of the user, and determining a gaze distance of the user based on the gaze directions of the both eyes. However, for convenience of descriptions, in each embodiment, a method of determining a gaze direction for one of both eyes will be mainly described.

FIG. 1 is a conceptual diagram for describing a method, performed by a device, of determining a gaze distance according to an embodiment.

Referring to FIG. 1, the device may acquire a plurality of images by capturing each of both eyes of a user. The device may detect specific points or specific portions of the plurality of acquired images and determine a gaze direction of the user by using a relationship between the detected points or the detected portions.

Hereinafter, descriptions will be given for a method of determining a gaze direction of the user from an image 10 (hereinafter, referred to as an eye image) of capturing a right eye of the user by using the device.

The device according to an embodiment may specify a pupil 110 of the user, an eye contour 120, and a corner point 130 located at an edge of the user's eye from the eye image 10. In addition, the device may use the eye contour 120 and a location of the corner point 130 to determine a reference point 140 indicating a gaze direction when the user gazes at the front.

The device may determine a gaze direction 150 of the user based on the location of the pupil 110 with respect to the reference point 140. For example, the device may determine the gaze direction 150 according to a current degree of distance of the pupil 110 from the reference point 140. In FIG. 1, as the location of the pupil 110 is in the right direction of the reference point 140, it may be determined that the user is gazing at the right direction.

To enhance the accuracy of the gaze direction, the device according to an embodiment may calibrate the location of the pupil 110 with respect to the reference point 140 based on a location of a camera and a three-dimensional model of the user's eyes. This will be described in detail later with reference to FIG. 7.

According to another embodiment, the device may determine a gaze direction by using a shape of an eyelid, which is determined based on the eye contour, in addition to the method of determining the gaze direction according to the above-described embodiment. For example, the device may determine a gaze direction by using a height and a curvature of the eyelid. This will be described in detail later with reference to FIGS. 5 and 6.

The device may determine the gaze distance based on a difference between gaze directions determined for both eyes of the user. Here, the gaze distance may indicate a distance between a location of an object at which the user gazes and a reference location (for example, the user's location). For example, the device may calculate a difference between gaze directions and an eye angle in the center direction to determine a gaze distance corresponding to the difference and the eye angle.

The device according to an embodiment may be embodied in various forms. For example, the device in the present specification may include a smart glass, a head mounted display (HMD), a near-eye display, a three-dimensional display, and the like, but this is merely an embodiment and the device is not limited thereto.

Figure 2:
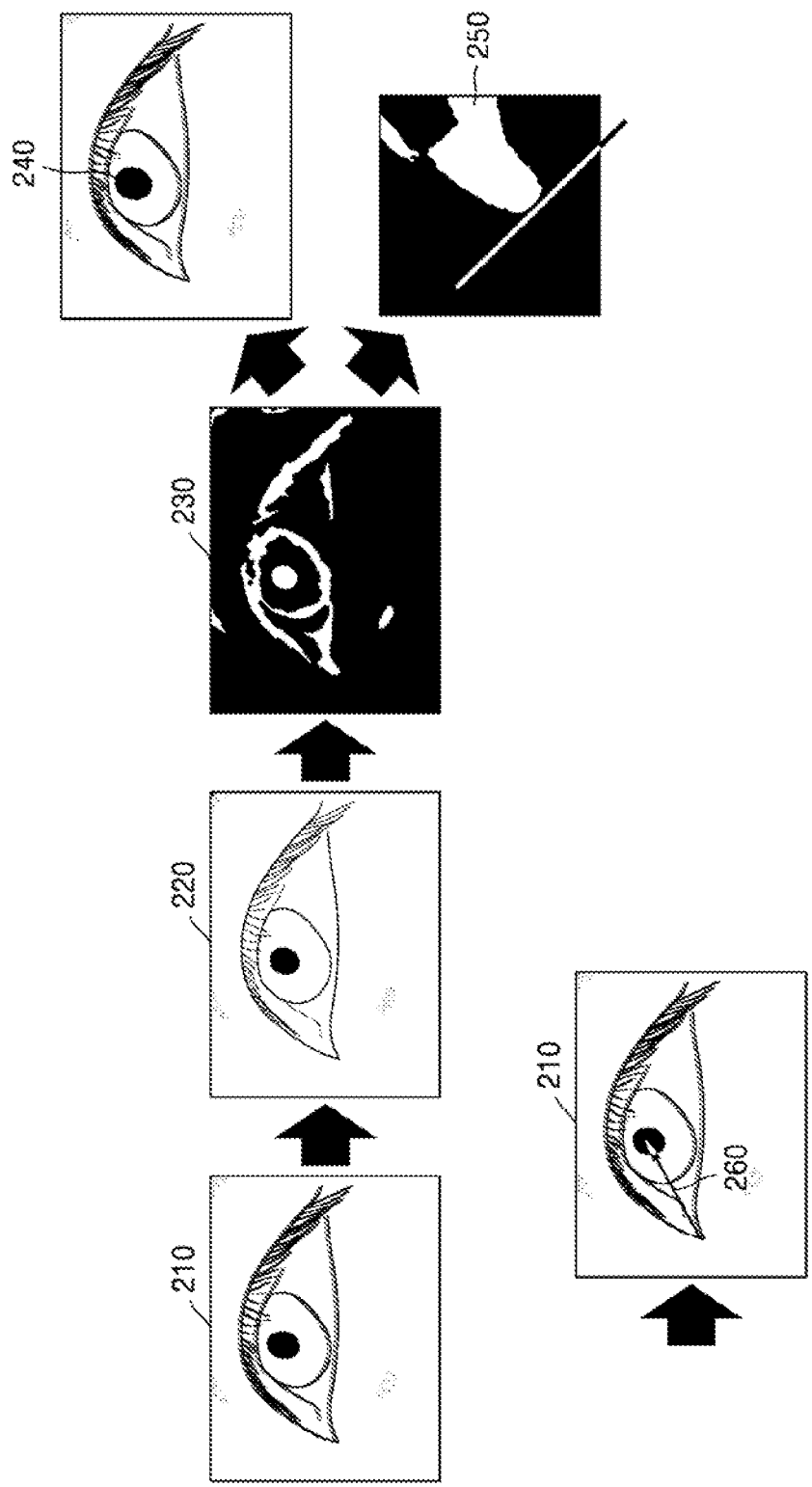
FIG. 2 is a diagram for describing a method of determining a gaze direction based on an image of a user's eye, according to an embodiment.

FIG. 2 is a diagram for describing a method of determining the gaze direction from an eye image 210 of the user, according to an embodiment.

Referring to FIG. 2, the device may acquire the eye image 210 by capturing the user's eye. The device may perform noise rejection to remove unnecessary contours from the eye image 210. Here, the noise rejection may be performed by using a bilateral filter or a median filter, but this is merely an embodiment, and the noise rejection method is not limited to the above-stated embodiment.

The device may perform edge detection on a noise-removed image 220. An existing edge detection method such as a canny edge detector may be used for edge detection. The device may extract a pupil 240 by using circular hough transform, based on a binary image 230 acquired as a result of performing the edge detection.

Furthermore, the device may extract the pupil 240 and estimate the eye contour based on the pupil 240. As the eye contour is estimated, the device may specify a corner point 250 located at an edge of the eye contour. Here, the corner point 251 may be located at a lachrymal gland of the eye, but this is merely an example, and the location of the corner point 250 may be modified according to setting.

The device according to an embodiment may determine a gaze direction of the user based on a difference 260 between a location of the pupil 240 and the location of the corner point 250.

Figure 3:
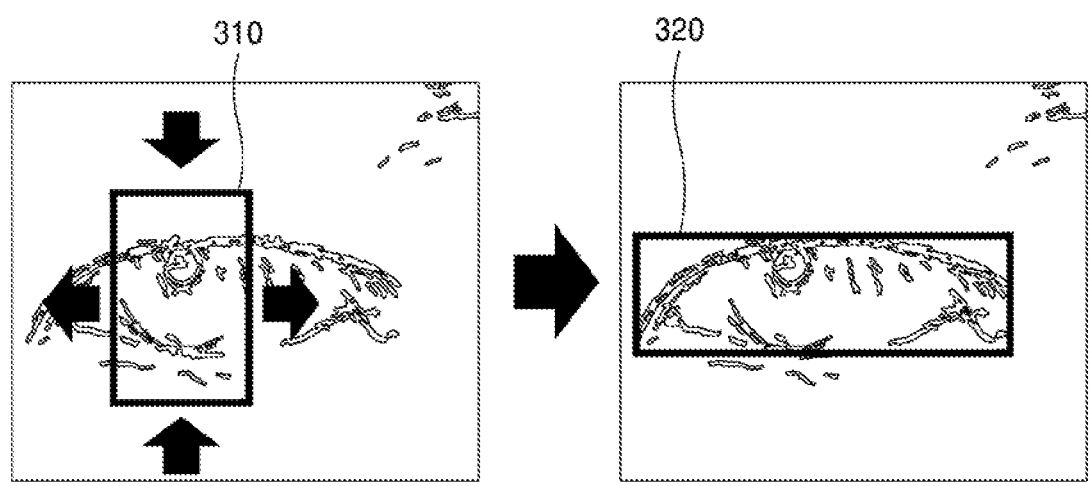
FIG. 3 is a diagram for describing a method by which a device according to an embodiment extracts an eye contour.

FIG. 3 is a diagram for describing a method, performed by the device, of extracting an eye contour according to an embodiment.

Referring to FIG. 3, the device may extract a contour of an eye region about the pupil after extracting the pupil from an eye image.

The device according to an embodiment may set up an edge region 310 about the pupil. The device may modify the edge region 310 such that the edge region 310 is close to the eye region. For example, the device may set a new edge region while expanding the edge region 310 to the left and right and shrinking the edge region 310 up and down.

The device may repeat the above-stated process until the edge region close to the eye region is derived. The device may extract the edge region, which is finally set, as a contour 320 of the eye region.

Figure 4:
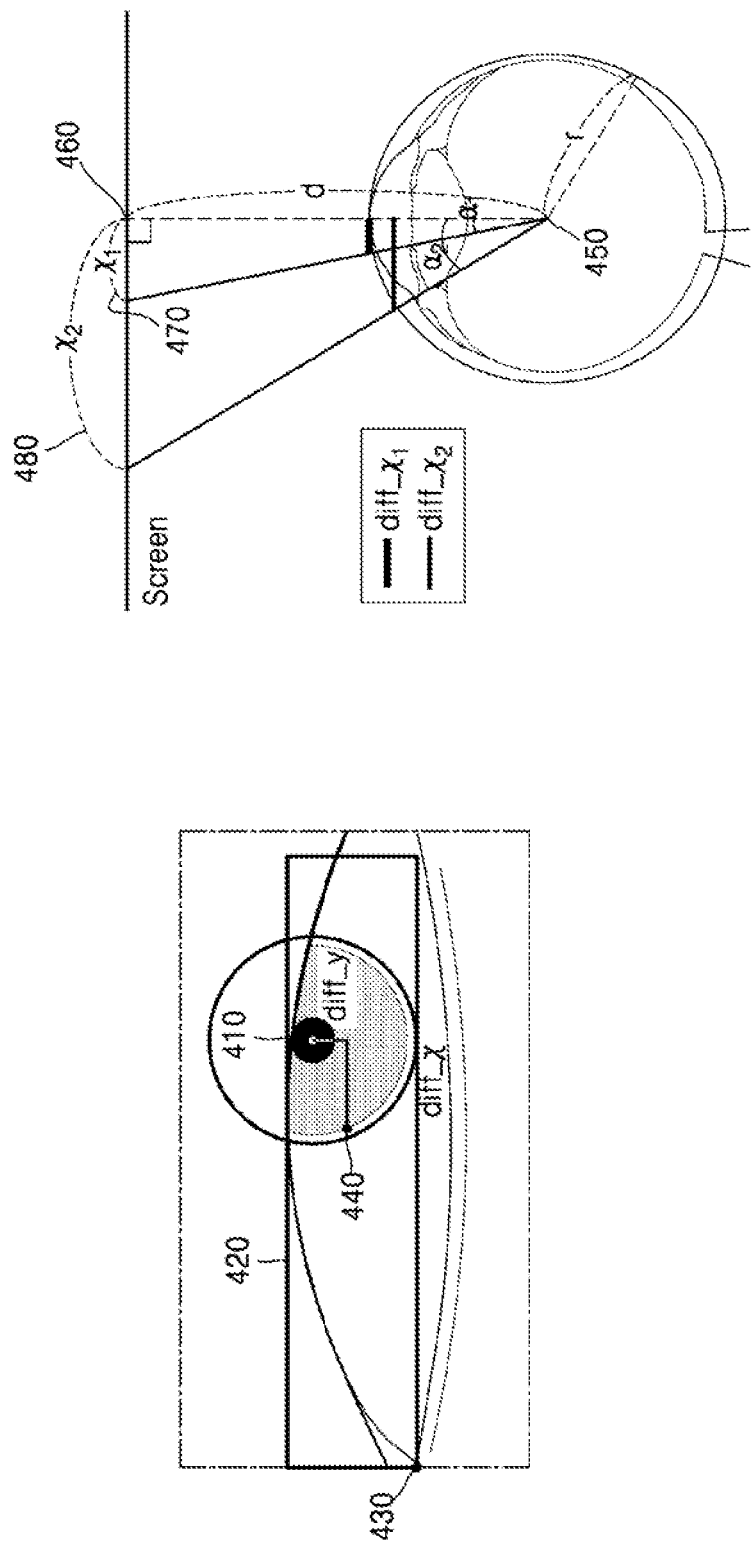
FIG. 4 is a diagram for describing a method by which a device according to an embodiment determines a gaze distance based on a location of a pupil and a reference point.

FIG. 4 is a diagram for describing a method, performed by the device, of determining a gaze direction based on a location of a pupil 410 and a reference point 440 according to an embodiment.

Referring to FIG. 4, the device may specify the pupil 410, an eye contour 420, and a corner point 430 from an eye image. In the present embodiment, the method by which the device specifies the pupil 410, the eye contour 420, and the corner point 430 may be identical to what is described above with reference to FIGS. 1 and 2.

The device according to an embodiment may use the eye contour 420 and a location of the corner point 430 to specify the reference point 440 indicating the gaze direction with respect to the front direction. The device may determine a relative position of the pupil 410 about the specified reference point 440. For example, the relative position of the pupil 410 about the reference point 440 may be marked as diff_x and diff_y. Here, diff_x may have a location difference value in the x axis direction, and diff_y may have a location difference value in the y axis direction. In addition, diff_x and diff_y may respectively indicate a gaze in the left and right direction of the user and a gaze in the up and down direction.

diff_x and diff_y calculated by using the device does not have a linear relationship with an actual gaze direction of the user. A relationship between x1 and diff_x1 and a relationship between x2 and diff_x2 may be respectively represented by Equation 1 and Equation 2 below.

$$x_1 = d \cdot \tan\left(\sin^{-1}\left(\frac{diffx1}{r}\right)\right)$$ [Equation 1]

$$x_2 = d \cdot \tan\left(\sin^{-1}\left(\frac{diffx2}{r}\right)\right)$$ [Equation 2]

In Equation 1 and Equation 2 above, d and r respectively indicate a distance from a center of an eyeball to an origin point 460 of a screen and a radius of the eyeball.

diff_x1 and diff_x2 for the reference point 450 in the eye do not have linear relationships with x1 470 and x2 480 for the origin point 460 on the screen. Particularly, when diff_x2 is about 2.2 times diff_x1, x2 480 may be about three times x1 470.

Accordingly, a calibration operation may be required for more precisely matching a relative location of the pupil 410 with respect to the reference point 440 and an actual gaze direction. The device according to an embodiment may perform the calibration operation on the gaze direction based on the location of the camera and the three-dimensional model for the user's eye. This will be described in further detail later with reference to FIG. 7.

Figure 5:
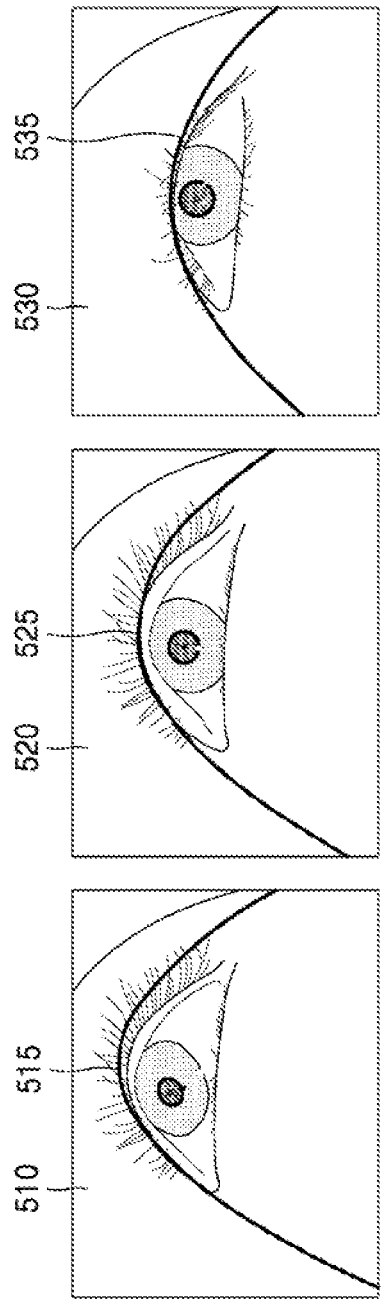
FIG. 5 is a diagram for describing a method by which a device according to an embodiment calibrates a gaze direction based on a curvature of an eyelid.

FIG. 5 is a diagram for describing a method by which the device according to an embodiment calibrates a gaze direction based on a curvature of an eyelid.

The device according to an embodiment may determine a reference point indicating a front direction based on the eye contour and a position of the corner point, and may determine the gaze direction of the user according to a location of a pupil based on the reference point. However, as x axis movement of the pupil is greater than y axis movement in the eye image, an operation of calibrating a movement degree on the y axis may be required.

The device according to an embodiment may use a shape of the eye to calibrate the movement degree of the pupil on the y axis. Although the shape of the eye may include a height of the eyelid, a curvature of the eyelid, and the like, this is merely an example and the shape of the eye is not limited to the above-stated examples.

In the present embodiment, a method of calibrating the movement degree of the pupil on the y axis based on the curvature of the eyelid will be described. The device may measure a curvature of the eyelid for each of the plurality of acquired images 510, 520, and 530. The device may determine the gaze direction by using the curvature of the eyelid in addition to a location of a pupil with respect to the reference point.

For example, for a first image 510 having a curvature above a threshold range, the device may determine that the gaze direction of the user is an upward direction. In addition, for a second image 520 having a curvature falling within the threshold range, the device may determine that the gaze direction of the user is a front direction. Furthermore, for a third image 530 having a curvature below the threshold range, the device may determine that the gaze direction of the user is a downward direction.

The device according to an embodiment may enhance the accuracy of the gaze direction by using the curvature of the eyelid as well as the location of the pupil about the reference point. Presented below is table 1 showing an increased error rate as a result of additionally using the curvature of the eyelid.

TABLE 1

| accuracy | error rate | | |
|---|---|---|---|
| | object 1 | object 2 | object 3 |
| before calibration | 2.7 | 4.7 | 3.7 |
| after calibration | 1.9 | 3.2 | 2.6 |

Figure 6:
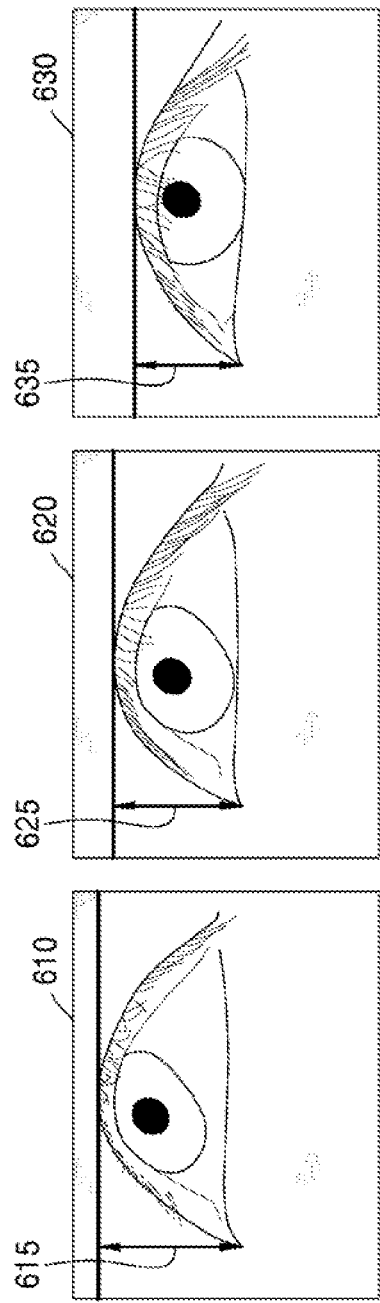
FIG. 6 is a diagram for describing a method by which a device according to an embodiment calibrates a gaze direction based on a height of an eyelid.

FIG. 6 is a diagram for describing a method by which the device according to an embodiment calibrates a gaze direction based on a height of an eyelid.

Referring to FIG. 6, the height of the eyelid may be determined as a difference between heights of a vertex and a corner point of a secondary curve of the eyelid. The device according to an embodiment may determine a reference point indicating the front direction based on an eye contour and a position of a corner point, and may determine a gaze direction of the user according to a location of a pupil based on the reference point. However, as x axis movement of the pupil is greater than y axis movement in the eye image as described above with reference to FIG. 5, an operation of calibrating a movement degree on the y axis may be required.

The device may use the height of the eyelid to calibrate movement information of the pupil on the y axis. The device may measure a height of the eyelid for each of the plurality of acquired images 610, 620, and 630. The device may determine the gaze direction by using the height of the eyelid in addition to the location of the pupil with respect to the reference point.

For example, for a first image 610 having an eyelid height 615 above the threshold range, the device may determine that the gaze direction of the user is the upward direction. In addition, for a second image 620 having an eyelid height 625 falling within the threshold range, the device may determine that the gaze direction of the user is the front direction. Furthermore, for a third image 630 having an eyelid height 635 below the threshold range, the device may determine that the gaze direction of the user is the downward direction.

Figure 7:
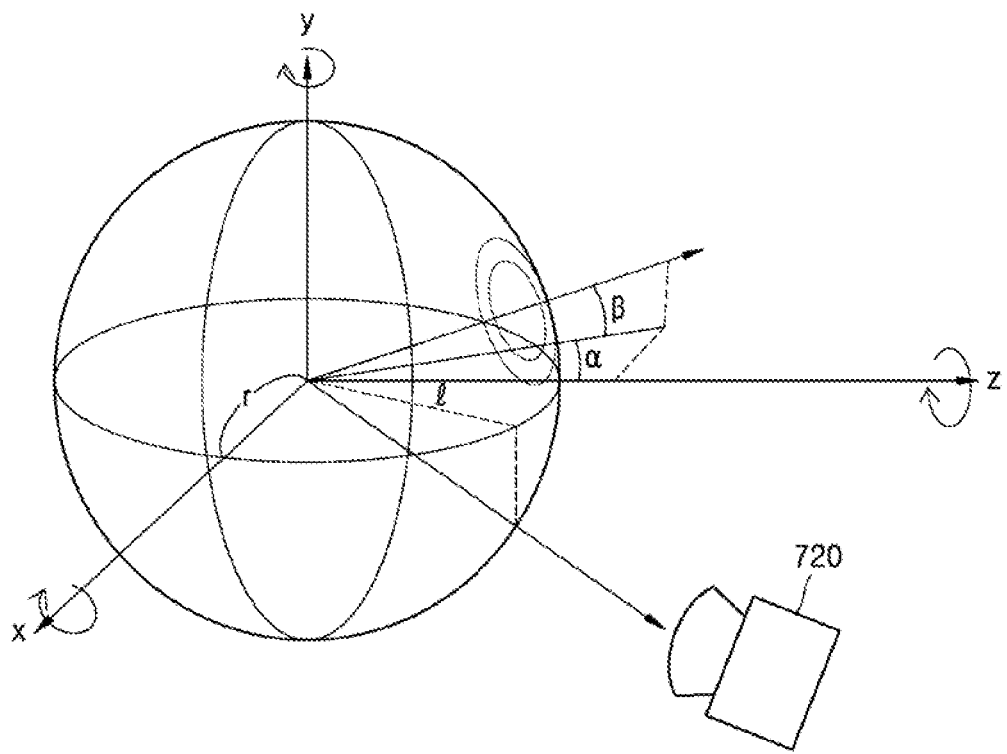
FIG. 7 is a diagram for describing a method by which a device according to an embodiment calibrates a gaze direction based on a three-dimensional model of eyes and a location of a camera.

FIG. 7 is a diagram for describing a method by which the device according to an embodiment calibrates a gaze direction based on a three-dimensional eye model 710 and a location of a camera.

Referring to FIG. 7, the device may acquire the three-dimensional eye model 710 and information regarding a location at which the camera 720 captures an eyeball. As described above with reference to FIG. 4, a difference in the location of the pupil with respect to the reference point in the eye does not have a linear relationship with an actual distance on the screen, and therefore, it is required to calibrate the gaze direction based on the three-dimensional eye model 710 and the location at which the camera 720 captures the eyeball.

The device according to an embodiment may apply information regarding the three-dimensional eye model 710 and the location at which the camera 720 captures the eyeball to Equation 1 and Equation 2 described above to determine values of x and y, which indicate the gaze directions, based on Equation 3 presented below.

$$x = d \cdot \tan\left(\sin^{-1}\left(\frac{diffx}{r\cos\beta}\right)\right)$$ [Equation 3]

$$y = d \cdot \csc\alpha \cdot \tan\left(\sin^{-1}\left(\frac{diffy}{r}\right)\right)$$

In Equation 3 presented below, α and β correspond to angles representing the pupil locations in the three-dimensional model of the eye, and d and r respectively represents a distance from a center of the eyeball to the origin point of the screen and the diameter of the eyeball, as shown in FIG. 4.

Equation is merely an example for calibrating the gaze directions and a method of calibrating the gaze direction based on the three-dimensional eye model and the location of the camera in the present specification is not limited thereto.

Figure 8:
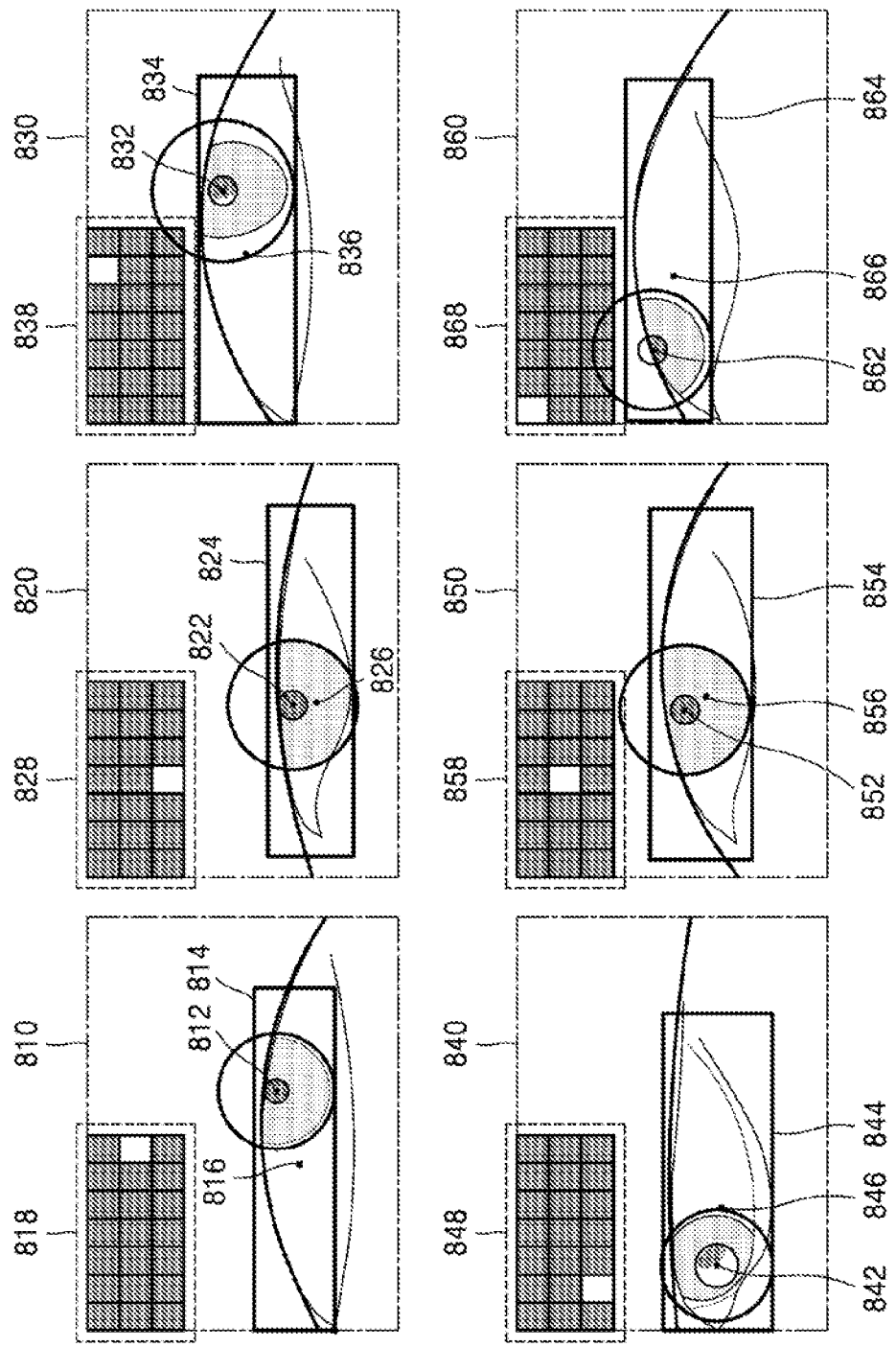
FIG. 8 is a diagram for describing a method, performed by a device, of determining at least one gaze direction based on a difference between a reference point and a location of a pupil, according to an embodiment.

FIG. 8 is a diagram for describing a method by which the device according to an embodiment determines at least one gaze direction based on a difference between a reference point and a location of the pupil.

Referring to FIG. 8, the device may determine a location of a pupil 812, a corner point, and an eye contour 814 from a first image 810. The device may determine a reference point 816 in the eye of the first image 810 based on the eye contour and a location of the corner point. The device may confirm that a gaze direction 818 of the user is the right direction by specifying the location of the pupil 812 with respect to the reference point 816.

In addition, the device may determine locations of pupils 822, 832, 842, 852, 862, corner points, and eye contours 824, 834, 844, 854, and 864 for second through sixth images 820, 830, 840, 850, and 860, respectively. The device may determine reference points 826, 836, 846, 856, and 866 in the eye respectively for the second through sixth images 820, 830, 840, 850, and 860, based on the eye contours 824, 834, 844, 854, and 864, and locations of the corner points. The device may determine gaze directions 828, 838, 848, 858, and 868 of the user for the second through sixth images 820, 830, 840, 850, and 860 by specifying locations of the pupils 822, 832, 842, 852, and 862 for the reference points 826, 836, 846, 856, and 866.

Figure 9:
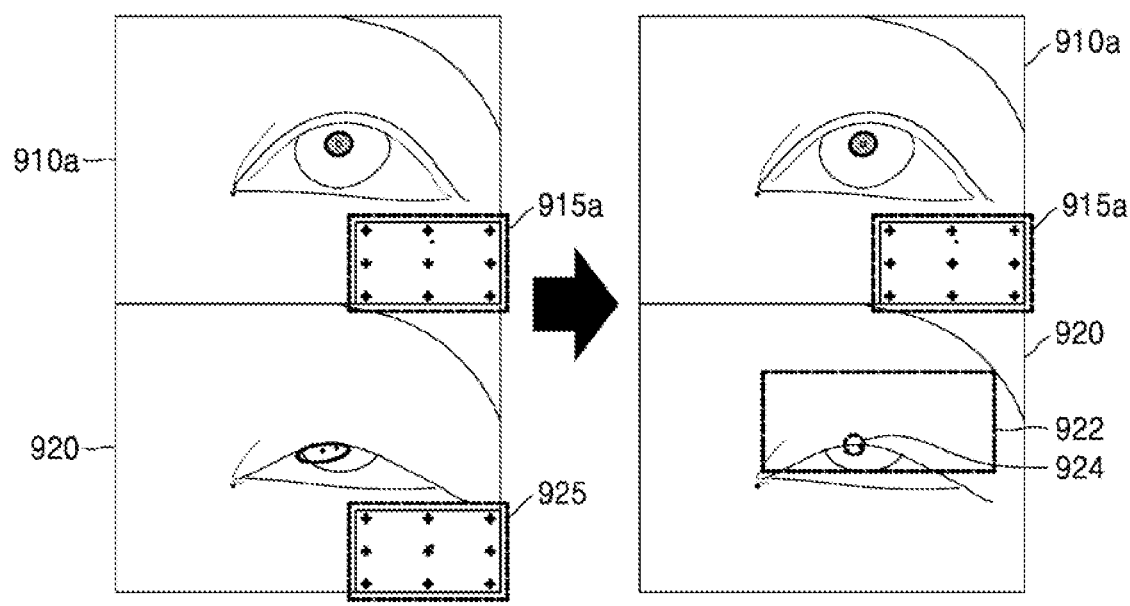
FIG. 9 is a diagram for describing a method by which a device according to an embodiment determines a gaze direction of an image in which eye blinking occurs.

FIG. 9 is a diagram for describing a method by which a device according to an embodiment determines a gaze direction of an image in which eye blink occurs.

Referring to FIG. 9, the device may acquire a new eye image 920 after a gaze direction 915 is determined based on an eye image 910 of the user. When eye blink is detected or a pupil is not detected from the new eye image 920, a gaze direction 925 determined based on the new eye image 920 may be inaccurate.

Accordingly, the device may determine whether the eye blink is detected 922 or whether the pupil is detected 924 for the new eye image 920. When the eye blink is detected or the pupil is not detected from the new eye image 920, the device may maintain the gaze direction for the new eye image 920 as the gaze direction that is previously determined. On the contrary, when the eye blink is not detected or the pupil is detected from the new eye image 920, the device may re-determine a gaze direction based on the new eye image 920.

Figure 10:
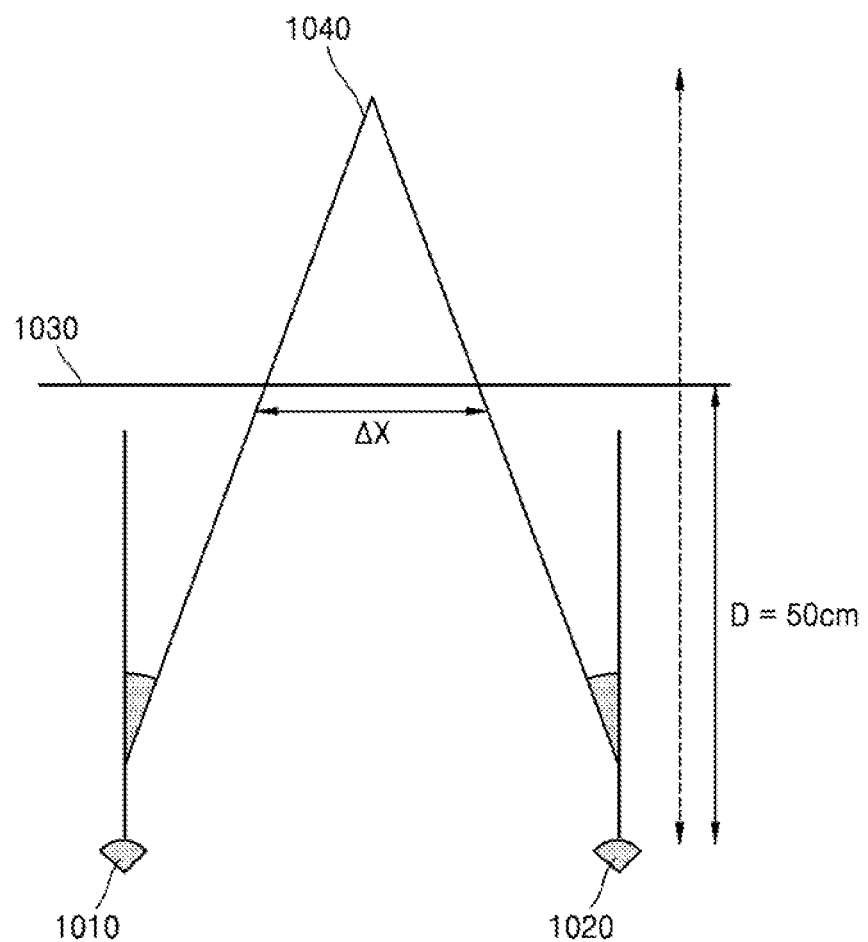
FIG. 10 is a diagram for describing a method by which a device according to an embodiment determines a gaze direction based on gaze directions of both eyes.

FIG. 10 is a diagram for describing a method by which the device according to an embodiment determines a gaze distance based on gaze distances of both eyes.

Referring to FIG. 10, the device may determine the gaze distance based on a difference between gaze directions of both eyes 1010 and 1020. Particularly, the device may determine a reference distance D for determining the gaze distance. The device may determine points at which gazes crossing each other toward a gaze point 1040 meet a plane 1030 on the reference distance D. The device may specify a difference between the determined points as Δx, that is, a difference between the gaze directions.

The device may determine the gaze distance by comparing Δx in a reference distance to the difference between the gaze directions that is newly acquired. Below is a table showing a gaze angle toward the center direction and a difference between the gaze directions for a distance.

TABLE 2

The gaze angle in the center direction and the difference in the gaze directions for the distance

| distance (cm) | a gaze angle in the center direction | the difference between the gaze directions (cm, $\Delta^x$) |
| --- | --- | --- |
| 50 | 4.0042 | 0 |
| 100 | 2.0045 | 3.5 |
| 150 | 1.3367 | 4.7 |
| 200 | 1.0026 | 5.3 |
| 250 | 0.8021 | 5.6 |

When the determined gaze distance is equal to or greater than a preset threshold distance, the device according to an embodiment may re-determine a gaze distance based on a three-dimensional distance sensor. For example, when the gaze distance is equal to 1.5 m or greater, the device may re-determine the gaze distance by using a stereo camera or a three-dimensional distance sensor such as a depth sensor.

Figure 11:
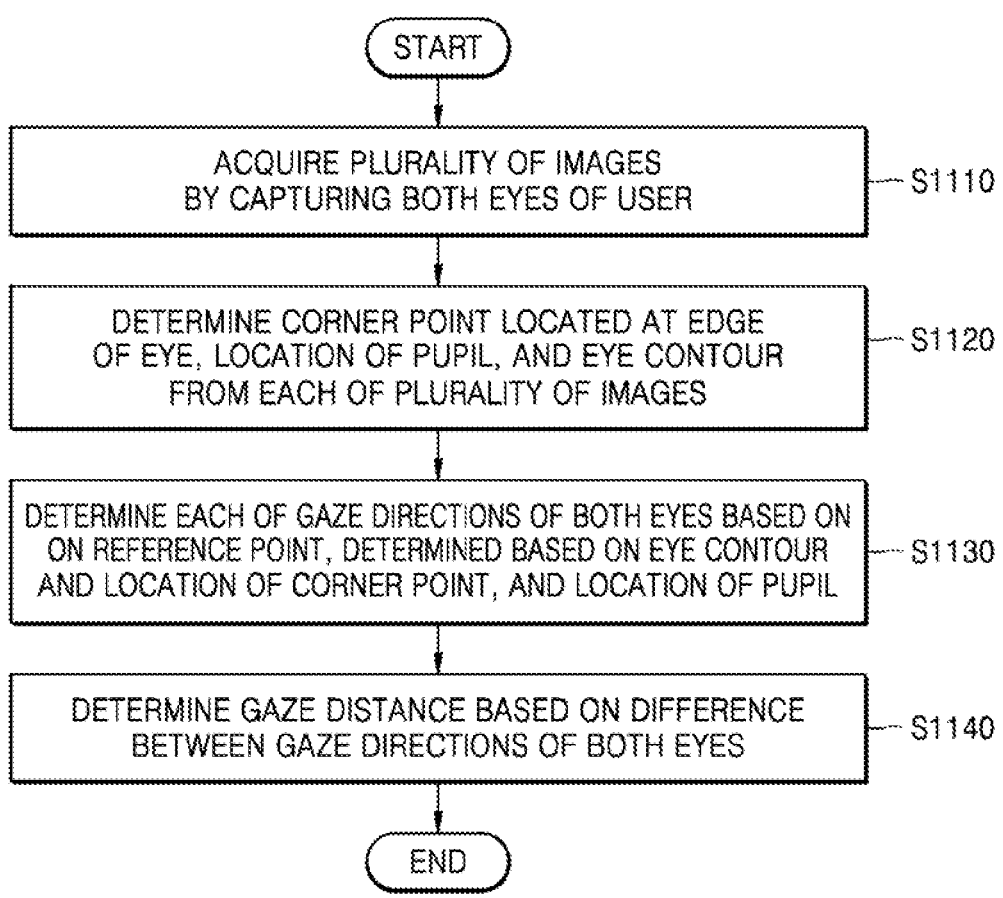
FIG. 11 is a flowchart for describing a method by which a device determines a gaze distance.

FIG. 11 is a flowchart for describing a method by which the device according to an embodiment determines a gaze distance.

In operation S1110, the device may obtain a plurality of images by capturing each of both eyes of the user.

The device according to an embodiment may include a plurality of cameras such that the cameras are located at portions adjacent to the both eyes of the user. The device may acquire images of the both eyes respectively captured by the plurality of cameras.

However, this is merely an example, and according to another embodiment, the device may also acquire, from another external device, a plurality of images by capturing the both eyes of the user.

In operation S1120, the device may determine a corner point located at an edge of the eye, a location of a pupil, and an eye contour from each of the plurality of images.

The method by which the device determines the corner point, the location of the pupil, and the eye contour from each of the plurality of images may correspond to the method described above with reference to FIG. 2.

In operation S1130, the device may determine the gaze directions of both eyes based on a difference between the reference points and the pupil location, wherein the reference point is determined based on the eye contour and a location of the corner point.

For example, when the pupil is on the right of the reference point, the device may determine that the user is gazing in the right direction. According to another example, when the pupil is on the left of the reference point, the device may determine that the user is gazing in the left direction.

According to another embodiment, the device may determine the gaze direction based on a shape of the user's eyelid in addition to the location of the pupil with respect to the reference point. This may be the same as that is described above with reference to FIGS. 5 and 6.

In operation S1140, the device may determine the gaze distance based on a difference between the gaze directions of both eyes.

The device according to an embodiment may determine the gaze direction of the user by comparing a difference value between the previously acquired gaze direction and a newly acquired gaze direction with respect to a reference distance. This may be identical to that is described above with reference to FIGS. 5 and 6.

The device may perform rendering on a virtual image based on the determined gaze distance.

Figure 12:
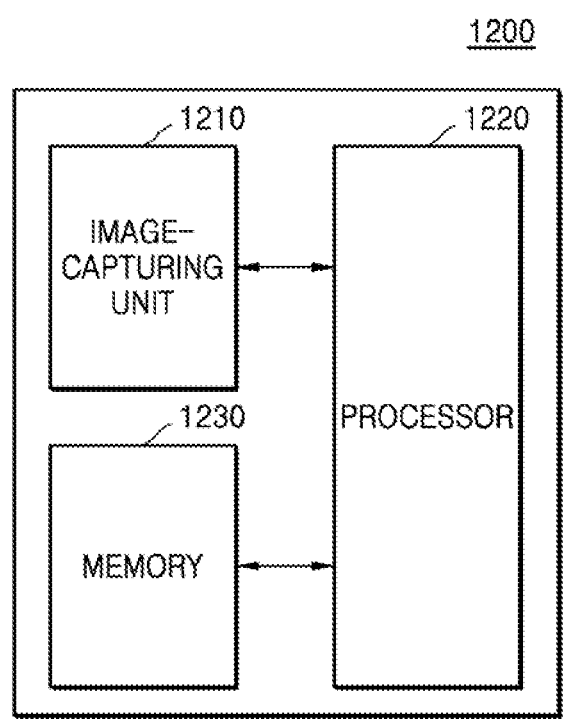
FIGS. 12 and 13 are block diagrams for describing a device determining a gaze distance according to an embodiment.
Figure 13:
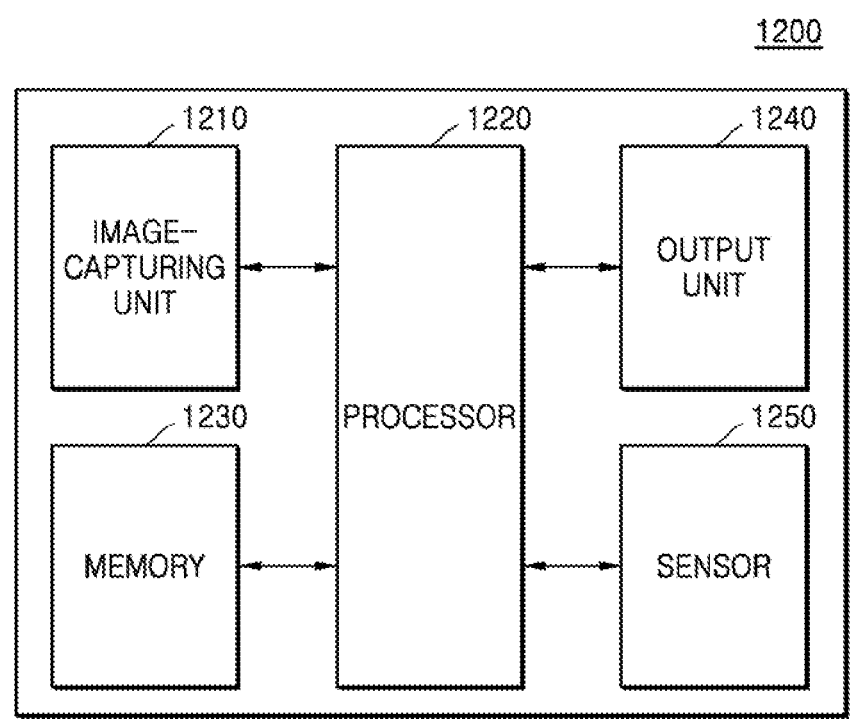

FIGS. 12 and 13 are diagrams for describing a device 1200 that determines a gaze distance according to an embodiment.

Referring to FIG. 12, the device 1200 may include an image-capturing unit 1210, a processor 1220, and a memory 1230. However, this is merely an embodiment and components of the device 122 are not limited to the examples stated above. For example, referring to FIG. 13, the device 1200 may further include an output unit 1240 and a sensor 1250 in addition to the image-capturing unit 1210, the processor 1220, and the memory 1230.

The image-capturing unit 120 may acquire a plurality of images by capturing both eyes of the user. The image-capturing unit 1210 according to an embodiment may include a plurality of cameras to capture each of the both eyes of the user.

The processor 1220 may determine a corner point located at an edge of the eye, a pupil location, and an eye contour from each of the plurality of images. In addition, the processor 1220 may determine the gaze directions of the both eyes based on a difference between the reference point and the location of the pupil, wherein the reference point is determined based on the eye contour and the location of the corner point.

The processor 1220 according to another embodiment may determine a shape of the eyelid from the eye contour and determine the gaze direction based on the difference between the reference point and the location of the pupil and the determined shape of the eyelid.

In addition, the processor 1220 may also determine the gaze direction by using the previously acquired three-dimensional model of the eye and locations of cameras capturing the both eyes of the user, based on a difference between the reference point and the location of the pupil.

The processor 1220 may determine whether the pupil is detected or whether the eye blink is detected for the image of each of the both eyes of the user acquired after the plurality of images. As a result of the determination, when the pupil is not detected or the eye blink is detected, the processor 1220 may maintain the gaze directions for the images of the both eyes of the user acquired after the plurality of images as previously determined gaze directions.

The processor 1220 may determine the gaze distance based on a difference between the gaze directions of the both eyes. The processor 120 may determine whether the determined gaze distance is equal to or greater than a preset threshold distance.

The memory 1230 may store programs (one or more instructions) for processing and controlling the processor 1220. The programs stored in the memory 1230 may be classified into a plurality of modules according to functions.

The output unit 1240 may output information processed by the device 1200. For example, the output unit 1240 may output a virtual image rendered according to the gaze distance determined by the processor 1220.

The sensor 1250 may determine the gaze distance of the user. For example, the sensor 1250 may include a depth sensor, a stereo camera or the like. The sensor 1250 may re-determine the gaze distance when the gaze distance determined by the processor 1220 based on the location of the pupil with respect to the reference point is equal to or greater than a threshold distance.

The method according to an embodiment of the disclosure may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software. Examples of the computer-readable recording medium includes a hard disk, a floppy disk, magnetic media such as a magnetic tape, optical media such as CD-ROM and DVD, magneto-optical media such as a floptical disk, and a hardware device such as ROM, RAM, and a flash memory particularly configured to store and execute program instructions. Examples of the program commands include a high-level language code that may be executed by a computer using an interpreter as well as a machine language code made by a compiler.

Although reference numerals are written in the embodiments shown in the drawings and particular terms are used for describing the embodiments, the disclosure is not limited to the particular terms, and the embodiments may include all elements that may be easily contemplated by those of skill in the art.

The embodiments may be described in terms of functional block components and various processing steps. Such functional blocks may be realized by any number of hardware or/and software components configured to perform the specified functions. For example, the embodiments may employ various integrated circuit components, e.g., memory elements, processing elements, logic elements, look-up tables, and the like, which may carry out a variety of functions under the control of one or more microprocessors or other control devices. Furthermore, the embodiments may employ a same type or different types of cores, and different types of CPUs. Similarly, where the elements of the disclosure are implemented using software programming or software elements, the embodiments may be implemented with any programming or scripting language such as C, C++, Java, assembler, or the like, with various algorithms being implemented with any combination of data structures, objects, processes, routines or other programming elements. Functional aspects may be implemented algorithms executed in one or more processors. Furthermore, the embodiments may employ related techniques for electronics configuration, signal processing, data processing and/or the like. Terms such as "mechanism", "element", "means", and "component" may be broadly used and are not limited to mechanical and physical components. The terms may include software routines in conjunction with processors and the like.

The particular implementations shown and described in the embodiments are illustrated examples of the disclosure and are not intended to otherwise limit the scope of the disclosure in any way. For the sake of brevity, conventional electronics configurations, control systems, software development and other functional aspects of the systems may not be described in detail. Furthermore, connecting lines or connectors shown in the drawings are intended to represent examples of functional relationships and/or physical or logical couplings between various elements, and many alternative or additional functional relationships, physical connections or logical connections may be present in a practical device. Moreover, no item or component is essential to the practice of the disclosure unless the element is specifically described as "essential" or "critical".

The use of the term "the" and similar references in the context of describing the embodiments (especially in the following claims) are to be construed to cover both the singular and the plural. Furthermore, recitation of ranges of values in the embodiments are merely intended to serve as a shorthand method of referring individually to each separate value falling within the range (unless otherwise indicated herein), and each separate value is incorporated into the specification as if it were individually recited herein. Finally, the steps of all methods described herein may be performed in any suitable order unless otherwise indicated in the specification or otherwise clearly contradicted by context. The embodiments are not necessarily limited to the order of describing the steps. The use of any and all examples or exemplary language (e.g., "such as") provided herein is intended merely to described in detail embodiments and does not limit the scope of the embodiments unless otherwise claimed. In addition, those of skill in the art may understand that various corrections, combinations, and modifications are available according to design conditions and factors in the attached claims or the scope of equivalents thereof.

The invention claimed is:

1. A method of identifying a gaze distance, the method comprising:
    obtaining a plurality of images by capturing each of both eyes of a user;
    identifying a corner point located at an edge of the eye, a location of a pupil, and an eye contour from each of the plurality of images;
    identifying each of gaze directions of both of the eyes based on a difference between a reference point and the location of the pupil, wherein the reference point is identified based on the eye contour and the location of the corner point;
    identifying respective points at which respective gazes of the eyes intersect a reference plane, based on the identified gaze directions;
    identifying the gaze distance based on a difference between respective locations of the identified points; and
    based on the identified gaze distance being greater than or equal to a preset threshold distance, performing an update of the gaze distance according to a three-dimensional distance sensor.

2. The method of claim 1, wherein the identifying of each of the gaze directions comprises:
    identifying a shape of an eyelid from the eye contour; and identifying each of the gaze directions based on the difference between the reference point and the location of the pupil, and the identified shape of the eyelid.

3. The method of claim 1, wherein the identifying of each of the gaze directions comprises identifying each of the gaze directions based on the difference between the reference point and the location of the pupil, by using a location of a camera capturing both eyes of the user and a preset three-dimensional eye model.

4. The method of claim 1, further comprising:
identifying whether the pupil is detected or eye blinking is detected for respective images of both of the eyes of the user acquired after the plurality of images; and
maintaining gaze directions for the images of both of the eyes of the user obtained after the plurality of images as the identified gaze directions when the pupil is not detected or the eye blinking is detected as a result of the identifying.

5. The method of claim 1, further comprising rendering a virtual image based on the gaze distance.

6. A device for identifying a gaze distance, the device comprising:
at least one camera;
a memory storing a plurality of instructions; and
at least one processor configured to execute the plurality of instructions to:
control the at least one camera to obtain a plurality of images by capturing each of both eyes of a user,
identify a corner point located at an edge of an eye, a location of a pupil, and an eye contour from each of the plurality of images,
identify each of gaze directions of both of the eyes based on a difference between a reference point and the location of the pupil, wherein the reference point is identified based on the eye contour and a location of the corner point,
identify respective points at which respective gazes of the eyes intersect a reference plane, based on the identified gaze directions,
identify the gaze distance based on a difference between respective locations of the identified points, and
perform an update of the gaze distance according to a three-dimensional distance sensor, based on the identified gaze distance being greater than or equal to a preset threshold distance.

7. The device of claim 6, wherein the at least one processor is further configured to identify a shape of an eyelid from the eye contour and identify each of the gaze directions based on the difference between the reference point and the location of the pupil, and the identified shape of the eyelid.

8. The device of claim 6, wherein the at least one processor is further configured to identify each of the gaze directions based on the difference between the reference point and a location of the pupil, by using a location of a camera capturing both eyes of the user and a preset three-dimensional eye model.

9. The device of claim 6, wherein the at least one processor is further configured to identify whether a pupil is detected or eye blinking is detected for respective images of both of the eyes of the user acquired after the plurality of images, and maintain gaze directions for the images of both of the eyes of the user acquired after the plurality of images as the identified gaze directions when the pupil is not detected or the eye blinking is detected as a result of the identifying.

10. The device of claim 6, wherein the at least one processor is further configured to render a virtual image based on the gaze distance.

11. A non-transitory computer-readable recording medium having recorded thereon a program for executing the method of claim 1 on a computer.

* * * * *